(12) United States Patent
Gordon et al.

(10) Patent No.: US 9,292,664 B2
(45) Date of Patent: Mar. 22, 2016

(54) KEY INJECTION TOOL

(71) Applicant: Lenovo (Singapore) Pte. Ltd., Singapore (SG)

(72) Inventors: Christopher Robert Gordon, Raleigh, NC (US); Keith W. Douglas, Chapel Hill, NC (US); David J. Pfeiffer, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 246 days.

(21) Appl. No.: 13/782,784

(22) Filed: Mar. 1, 2013

(65) Prior Publication Data

US 2014/0250255 A1    Sep. 4, 2014

(51) Int. Cl.
*G06F 3/06* (2006.01)
*G06F 21/10* (2013.01)
*G06F 21/12* (2013.01)
*G06F 21/73* (2013.01)

(52) U.S. Cl.
CPC .............. *G06F 21/105* (2013.01); *G06F 21/73* (2013.01)

(58) Field of Classification Search
CPC ......... G06F 3/06; G06F 3/0679; G06F 21/73; G06F 21/105; G06F 21/10; G06F 21/12
USPC ................... 711/102, 123, 125; 375/E7.009, 375/E7.024; 348/E5.006, E7.07; 707/53; 712/E9.046; 713/176; 717/172, 177
See application file for complete search history.

(56) References Cited

U.S. PATENT DOCUMENTS

| 6,169,976 | B1* | 1/2001 | Colosso | 705/59 |
| 2003/0149670 | A1* | 8/2003 | Cronce | 705/59 |
| 2005/0229257 | A1* | 10/2005 | Kim et al. | 726/27 |
| 2008/0044026 | A1* | 2/2008 | Walters et al. | 380/277 |
| 2008/0319779 | A1* | 12/2008 | Hughes et al. | 705/1 |
| 2010/0250960 | A1* | 9/2010 | Ogura | 713/189 |
| 2010/0251346 | A1* | 9/2010 | Dumais | 726/5 |
| 2011/0010770 | A1* | 1/2011 | Smith et al. | 726/18 |
| 2012/0131349 | A1* | 5/2012 | Layson et al. | 713/182 |
| 2013/0031541 | A1* | 1/2013 | Wilks et al. | 717/176 |
| 2014/0095853 | A1* | 4/2014 | Sarangshar | 713/1 |
| 2014/0122901 | A1* | 5/2014 | Bilke et al. | 713/193 |

OTHER PUBLICATIONS

Intel Platform Innovation Framework for EFI ACPI Table Storage Specification Version 0.91, Aug. 2006 (18 pages).
Advanced Power Management (APM) BIOS Interface Specification, Revision 1.2, Feb. 1996 (77 pages).
Intel System Configuration Utility User Guide Sysfg Version 10.0/11.0, Dec. 2012 (62 pages).
Microsoft Software Licensing Tables (SLIC and MSDM), Nov. 2011 (4 pages).
Windows Preinstallation Environment: Technical Overview, 2003 (18 pages).

(Continued)

*Primary Examiner* — Kevin Verbrugge
*Assistant Examiner* — Kamal Dewan
(74) *Attorney, Agent, or Firm* — Brian J. Pangrle

(57) ABSTRACT

A method can include injecting key information from memory of a memory device into non-volatile memory of a hardware device via a data port of the hardware device; receiving via the data port identification information from the hardware device that identifies the hardware device; and associating the key information and the identification information in the memory of the memory device. Various other apparatuses, systems, methods, etc., are also disclosed.

19 Claims, 10 Drawing Sheets

(56) References Cited

OTHER PUBLICATIONS

UEFI and Windows, Jun. 2012 (9 pages).
Lenovo BIOS Windows Management Instrumentation Interface Development Guide for Desktop, Apr. 2010 (32 pages).
Intel Firmware Hub to SPI Flash Conversion, Sep. 2008, Revision 001 (18 pages).
INFOSEC Institute: Chapter 8—UEFI and the TPM: Building a foundation for platform trust, Jun. 2012 (13 pages).

* cited by examiner

DB Table 810

| Tool Info | Bin Data | BIOS Tools | BIOS Data | Log Data | Other |
|---|---|---|---|---|---|

| | Plant Code | WO Number | Tool(s) Version |
|---|---|---|---|
| | | | |
| | | | |

DB Table 820

| Tool Info | Bin Data | BIOS Tools | BIOS Data | Log Data | Other |
|---|---|---|---|---|---|

| | Bin ID | Bin File | Drive ID | Part No. | Existing | Consumed |
|---|---|---|---|---|---|---|
| | | | | | | |
| | | | | | | |

DB Table 840

| Tool Info | Bin Data | BIOS Tools | BIOS Data | Log Data | Other |
|---|---|---|---|---|---|

| | MTM | Serial | Key ID | Prod Key ID | BIOS | HW Hash |
|---|---|---|---|---|---|---|
| | | | | | | |
| | | | | | | |

FIG. 8

KEY INJECTION TOOL

TECHNICAL FIELD

Subject matter disclosed herein generally relates to technologies and techniques for handling information.

BACKGROUND

Various types of software may be subject to a license or other information. Managing such information may be burdensome. As an example, consider an operating system that is subject to a license, which may be represented by a key (e.g., a product key). In such an example, it may be necessary to store the key, key information, etc. in memory of the computer and "activate" the operating system before it can be used. For example, a process to inject the key or key information into a computer can involve accessing a secure server via a network interface of the computer and instructing the server to access the key or key information and to perform various related tasks. As an example, consider a so-called OEM Activation "OA" digital product key (DPK) process for an operating system (e.g., a software product) that involves connecting a computer to a network for server-based support in generating a DPK bin file, injecting the DPK bin file into the computer and generating and collecting a hardware hash code, which is to be transmitted to an authority associated with the operating system (e.g., a server, etc.) to activate the operating system. As such server-based support may be accessible only at one or more dedicated sites, to perform the OA DPK process, a computer must be at such a site, for example, transported from its manufacturing site to one of the dedicated sites. Physically shipping a computer (or computers) can be time consuming and costly.

SUMMARY

A method can include injecting key information from memory of a memory device into non-volatile memory of a hardware device via a data port of the hardware device; receiving via the data port identification information from the hardware device that identifies the hardware device; and associating the key information and the identification information in the memory of the memory device. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

FIG. 8 is a diagram of examples of tables;

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Figure 1:
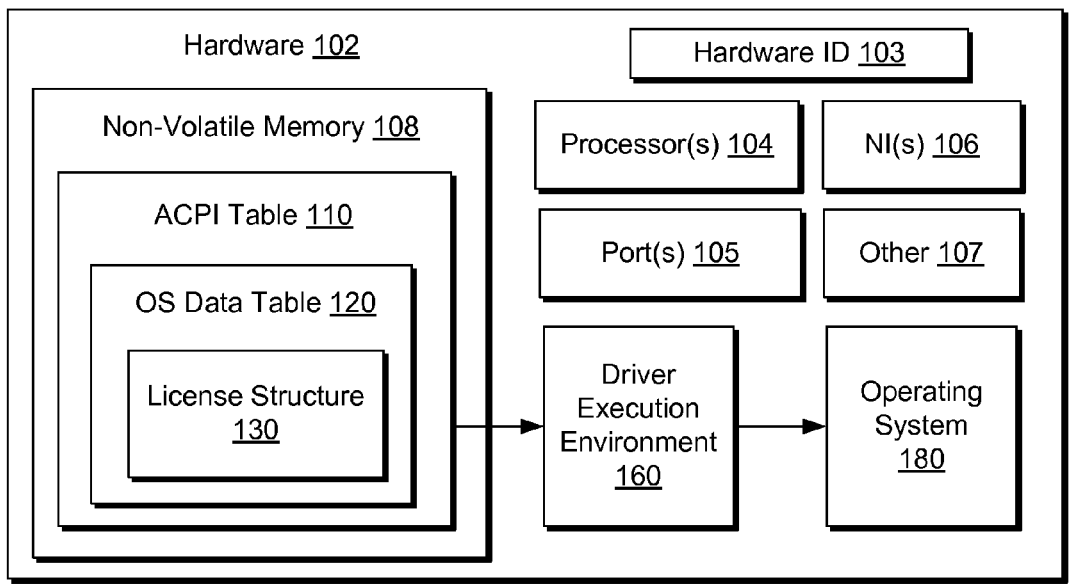
FIG. 1 is a diagram of an example of hardware and an example of a method.
Figure 1:
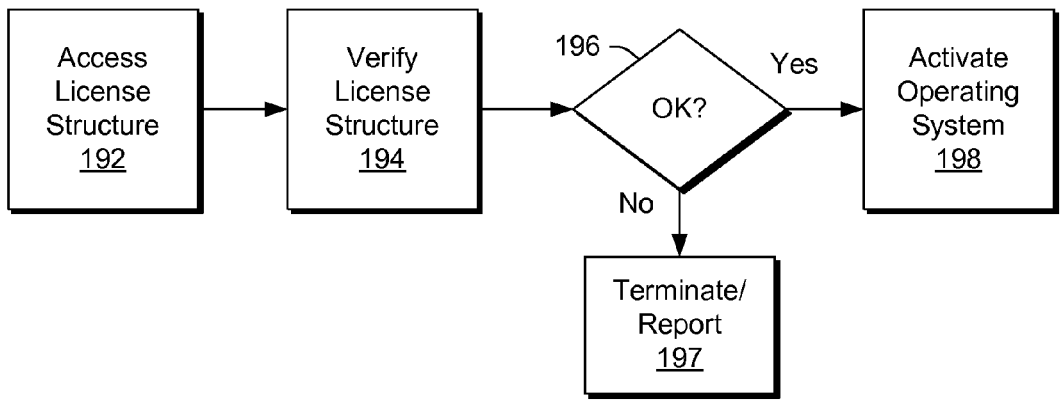

FIG. 1 shows an example of hardware 102 and an example of a method 190. As an example, the hardware 102 may be a computing device, an information handling device, a printer, a camera, a GPS device, vehicle hardware, a phone, etc. that includes memory and a data port (e.g., whether a wired data port or a wireless data port or both). In the example of FIG. 1, the hardware 102 includes a hardware identifier 103 (e.g., an identification code) that may uniquely identify the hardware 102, one or more processors 104 (e.g., single core, multi-core, graphics core, ASIC, RISC, etc.), one or more ports 105 (e.g., one or more data ports), and optionally one or more other components 107.

In the example of FIG. 1, the hardware 102 also includes non-volatile memory 108 (e.g., "NVM"). For example, the non-volatile memory 108 can retain stored information, for example, even where power is not supplied to the memory. Some examples of non-volatile memory include read-only memory (ROM), flash memory, ferroelectric RAM, magnetic computer storage devices (e.g., consider hard disks, floppy disks, magnetic tape, etc.), optical discs, etc.

As an example, the non-volatile memory 108 may be accessible via a boot interface. For example, a basic input/output system (BIOS) interface may be a boot interface, an extensible firmware interface (e.g., EFI or unified EFI) may be a boot interface, etc. As an example, an EFI may include a compatibility support module (CSM) that may emulate BIOS (e.g., emulate a BIOS boot interface).

As an example, a boot interface may be described as existing between hardware and an operating system (OS). As an example, a boot interface may be described as residing between firmware of the hardware and an operating system, for example, depending on the characteristics of the hardware. As an example, consider an Intel® chipset (Intel Corp., Santa Clara, Calif.) that includes Intel® firmware that interfaces with a boot interface, for example, for accessing a bootable device such as a hard drive, a solid-state drive, a drive connected via a data port (e.g., whether wired or wireless), etc. As an example, injected information may be associated with firmware, an operating system, other code, a transaction process, etc. (e.g., to permit use of firmware, an operating system, or other code, to permit a transaction process, etc.).

As an example, an operating system (OS) may act as an interface between hardware and higher-level software, for example, by coordinating activity, managing shared resources among applications, etc. As an example, an OS may interact with firmware during a boot process and then, for example, primarily interact with hardware (e.g., optionally without the firmware as a layer between the hardware and the OS).

As an example, a pre-OS operating system, which may be referred to at times as a "utility OS", may be loaded and implemented during a boot process for another OS (e.g., a fuller featured OS). Such a pre-OS (e.g., boot process OS, utility OS, etc.) may include its own "pre-OS boot process" and, for example, be retired once a targeted OS is loaded. As an example, a utility OS may be implemented to perform one or more tasks without loading another OS. In such an example, a boot process for the utility OS may terminate after loading and booting the utility OS.

As an example, the WINDOWS® Preinstallation Environment (WINDOWS® PE™) operating system (Microsoft Corp., Redmond, Wash.) may be considered a utility OS. As an example, the WINDOWS® PE OS version 2.0 is a minimal Win32 operating system with limited services that may be used to prepare a computer for a fuller featured WINDOWS® OS installation, to copy disk images from a network file server, to initiate a WINDOWS® OS setup, etc.

In general, the WINDOWS® PE OS is not designed to be a primary operating system for a computer (e.g., a notebook, desktop, server, etc.), but rather to establish a preinstallation environment. For example, the WINDOWS® PE OS may assist an OEM, an entity (e.g., corporation, etc.), etc. to boot a device (e.g., a computing device, information handling device, etc.) where that device may not include another operating system (e.g., consider another OS selected from the WINDOWS® family of operating systems such as WINDOWS® 7, WINDOWS® 8, etc.).

As an example, the aforementioned UEFI boot interface may comply with a UEFI specification, which may define a "boot manager". As an example, a boot manager may be a firmware policy engine for loading an OS loader and, for example, associated drivers. As an example, a boot configuration may be controlled by a set of variable values stored in non-volatile memory, for example, which may include boot variables that indicate paths to loaders, etc.

As an example, an OS loader may be a class of UEFI applications, for example, stored as files on a file system that can be accessed by firmware; noting that UEFI does not necessarily rely on a boot sector. As an example, UEFI firmware can include a user interface for a boot manager, for example, to allow a user or other controller to select and load an OS from possible options (e.g., a hard drive, a remote drive, a drive connected via a data port, etc.).

As an example, a UEFI specification may include a protocol known as "secure boot", for example, to secure a boot process by avoiding loading of one or more drivers, one or more OS loaders, etc., that may not be signed with an acceptable digital signature. As an example, when "secure boot" is enabled, it may initially be placed in a "setup" mode, for example, that allows a public key known as a "platform key" (PK) (e.g., or product key, or digital product key "DPK") to be written to firmware (e.g., stored in non-volatile memory).

While a key is mentioned, such information may optionally be "key information", for example, information derived at least in part based on a key. As an example, once a key (e.g., or key information) is written, a secure boot may enter a "user" mode, for example, where drivers and loaders signed with the key can be loaded by the firmware. As an example, the aforementioned "secure boot" process may be supported by one or more operating systems such as, for example, one or more of the WINDOWS® 8 OS family, the WINDOWS® Server 2010 OS family, various LINUX® OS families, etc.

As an example, one or more extensions to an extensible firmware interface (e.g., which may be a boot interface), depending on configuration, may be loaded from a non-volatile storage device connected to hardware. For example, an original equipment manufacturer (OEM) may distribute systems with an EFI partition on the hard drive, which may add additional functions to a standard EFI firmware, for example, as stored on ROM of a motherboard.

As an example, hardware may include firmware that provides a set of instructions executed during a boot process that may then pass control to a boot application like the boot loader in an OS or, for example, a tool that runs before an OS is loaded (e.g., a pre-OS tool). As mentioned, a pre-OS operating system (e.g., a utility OS) may be loaded and booted. In the foregoing example, a pre-OS tool may be executed in an environment established by the utility OS (e.g., WINDOWS® PE OS or other utility OS, etc.).

As an example, a boot process may include loading and booting a utility OS to establish a utility OS environment for executing code for one or more pre-OS tools that may, for example, assist with loading and booting another OS, which may be a fuller featured OS.

Referring again to the example hardware 102 of FIG. 1, the non-volatile memory 108 is shown as including an Advanced Configuration and Power Interface (ACPI) table 110, which may be provided for purposes of licensing (e.g., software licensing). As an example, where licensing of an operating system is involved, the ACPI table 110 may include an OS data table 120 that includes a license structure 130. For example, for a WINDOW® OS, the licensing structure 130 may be in a software licensing (SLIC) table or a Microsoft Data Management (MSDM) table (e.g., as the OS data table), for example, where such a table (or tables) includes a licensing structure field, for example, to store key information (e.g., in association with the hardware 102 and, for example, the hardware ID 103). As an example, a SLIC table may be provided to define information for enabling "generic" activation of an OS while a MSDM table may be provided to define information for enabling "individualized" activation of an OS. As an example, information for licensing, etc. may be referred to as a "payload" and, for example, stored in a field of a table. As an example, a tool (e.g., a pre-OS tool) may be configured to provide such a payload. As an example, a table may be constructed and injected into non-volatile memory of hardware (e.g., a computer, a hardware unit, etc.).

As an example, a table may define information to enable activation of software (e.g., an operating system). As an example, an OEM may be licensed by an authority and receive approved licensing information before generating a table with key information. As an example, an OEM may provide a tool or tools that address a motherboard, a boot interface, etc., for example, to construct a table with key information and to inject it via ACPI to an appropriate non-volatile memory location (e.g., as a table with a field to store the key information). As an example, key information may be in the form of a data structure that includes licensing data to enable activation of software (e.g., an OS, etc.).

In the example of FIG. 1, the table 110 may be accessed via a driver execution environment 160 that determines whether a license for a licensable operating system 180 has been or can be activated and, in turn, to load the licensable operating system 180 to establish an operating system environment on the hardware 102.

As to the method 190, it includes an access block 192 for accessing a license structure, a verification block 194 to verify the accessed license structure, a decision block 196 to decide whether the license structure is verified, a termination and/or reporting block 197 to be executed if the license structure is not verified and an activation block 198 to activate an operating system if the license structure is verified. In such an example, the license structure may include information that associates it with particular hardware (e.g., where an underlying license is hardware specific).

While the examples of FIG. 1 pertain to an operating system (see, e.g., the OS 180 and the activation block 198), key information may be for another purpose. For example, key information may pertain to firmware for a device such as a printer, pertain to transactions such as financial transactions, etc. As to key information for transactions, consider hardware that includes a trusted platform module (TPM) that can store key information for use in performing authorized transactions such as financial transactions (e.g., banking, credit card, on-line purchases, equity trading, derivatives trading, etc.). In such an example, a method may, rather than activate an OS, allow a transaction to be performed. In such an example, an access block may access non-volatile memory of a TPM (e.g., via a low pin count interface or other interface) or other hardware component, for example, which may include a unique identifier (e.g., a unique TPM, an "owned" TPM, etc.).

Figure 2:
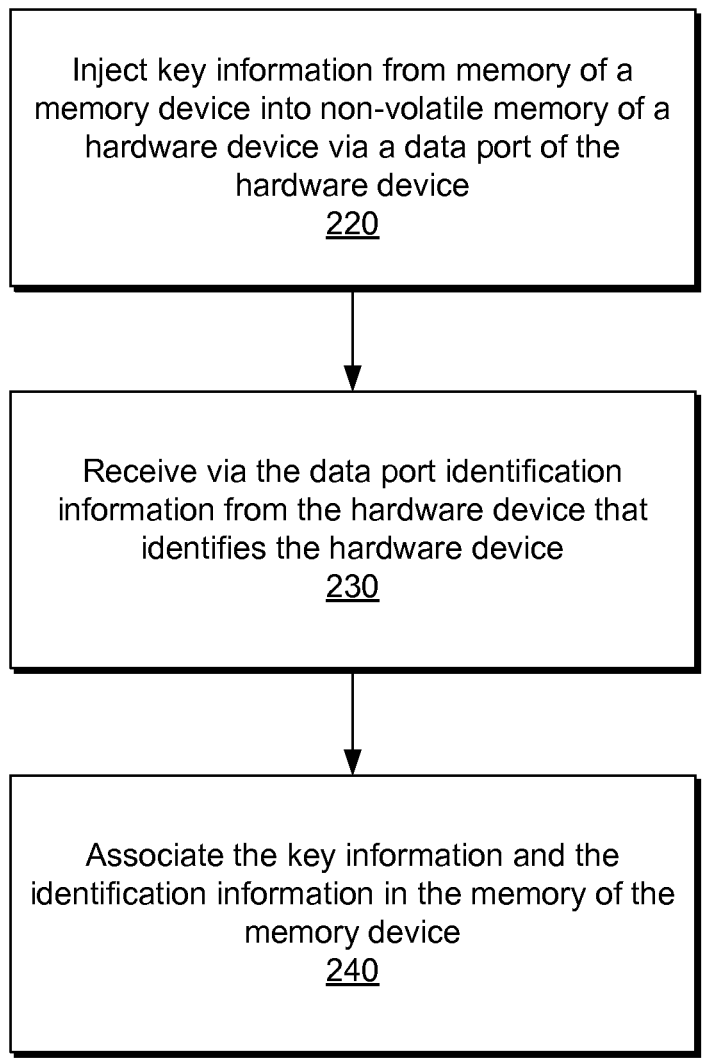
FIG. 2 is a diagram of an example of a method.

While examples of FIG. 1 may be described in part as to use of key information, FIG. 2 shows an example of a method 210 for injecting key information into non-volatile memory of a hardware device. Such a method may be performed to inject first key information, to inject additional key information or, for example, to replace existing (e.g., current) key information in non-volatile memory of a hardware device.

In the example of FIG. 2, the method 210 includes an injection block 220 for injecting key information from memory of a memory device into non-volatile memory of a hardware device via a data port of the hardware device, a reception block 230 for receiving via the data port identification information from the hardware device that identifies the hardware device; and an association block 240 for associating the key information and the identification information in the memory of the memory device. As an example, such a method can include booting the hardware device via the data port (e.g., where the data port is a bootable data port).

As an example, a method can include, as part of an injection process, accessing an operating system image from memory of a memory device and executing the operating system using the processor. In such an example, the method may include accessing code from the memory of the memory device via a data port and executing the code using the executing operating system to inject the key information into the non-volatile memory of the hardware device. As an example, such an operating system may be a utility operating system (e.g., a pre-OS operating system) that may retire upon loading of another operating system (e.g., a fuller featured OS).

As an example, a method may include injecting key information where the key information provides for activation of an operating system executable on the hardware device. As an example, activation of the operating system may occur after reporting associated key information and identification information via a network to an activation service (e.g., an authority, etc.).

As an example, a method can include injecting another key information from memory of a memory device into non-volatile memory of another hardware device via a data port of the other hardware device; receiving another identification information from the other hardware device that identifies the other hardware device; and associating the other key information and the other identification information of the other hardware device in the memory of the memory device. In such a manner, the memory device may provide for injecting key information into non-volatile memory of a plurality of hardware devices, for example, where each hardware device receives different key information. For example, the memory of the memory device may include a plurality of key informations, each of which may be associated with a different hardware device via a plurality of injection processes (e.g., per the injection block 220 of the method 210).

As an example, a method can include an association process that includes storing key information and identification information in a database in the memory of the memory device. In such an example, the database may provide for storage of key information and identification information for a plurality of hardware devices. In such an example, for each of the plurality of hardware devices, key information may be unique yet be used for similar purpose for each of the plurality of hardware devices (e.g., activation of an operating system, etc.). As an example, where a plurality of hardware devices are involved in a method (e.g., a repeatable method), each of the hardware devices may include identification information that uniquely identifies each of the hardware devices. For example, each of the plurality of hardware devices may be injected with unique key information that is associated with unique hardware identification information. In such an example, memory of a memory device may store the associated key information and hardware information for each of the plurality of hardware devices in a database, optionally along with additional information (e.g., prior key information stored in non-volatile memory of a hardware device, licensing information, one or more dates, version information, etc.).

As an example, a method may include injecting key information from memory of a USB device, for example, via a USB port of a hardware device (e.g., where a USB port may be considered to be a type of data port and, for example, may be a bootable data port).

As an example, a hardware device may include a motherboard that includes non-volatile memory. In such an example, a method may include injecting key information into the non-volatile memory of the motherboard of the hardware device via a data port of the hardware device. As an example, a motherboard may include identification information, for example, that may uniquely identify the motherboard (e.g., and hence the hardware device in which it resides). As mentioned, where a hardware device includes a hardware component such as a trusted platform module (TPM) that includes non-volatile memory, a method may include injecting key information from memory of a memory device into the non-volatile memory of the hardware component via a data port (e.g., of a hardware device to which the hardware component is operatively coupled). As mentioned, such key information may be utilized for one or more purposes, for example, for permission to execute code on a hardware device, for permission to perform a transaction, etc.

Figure 3:
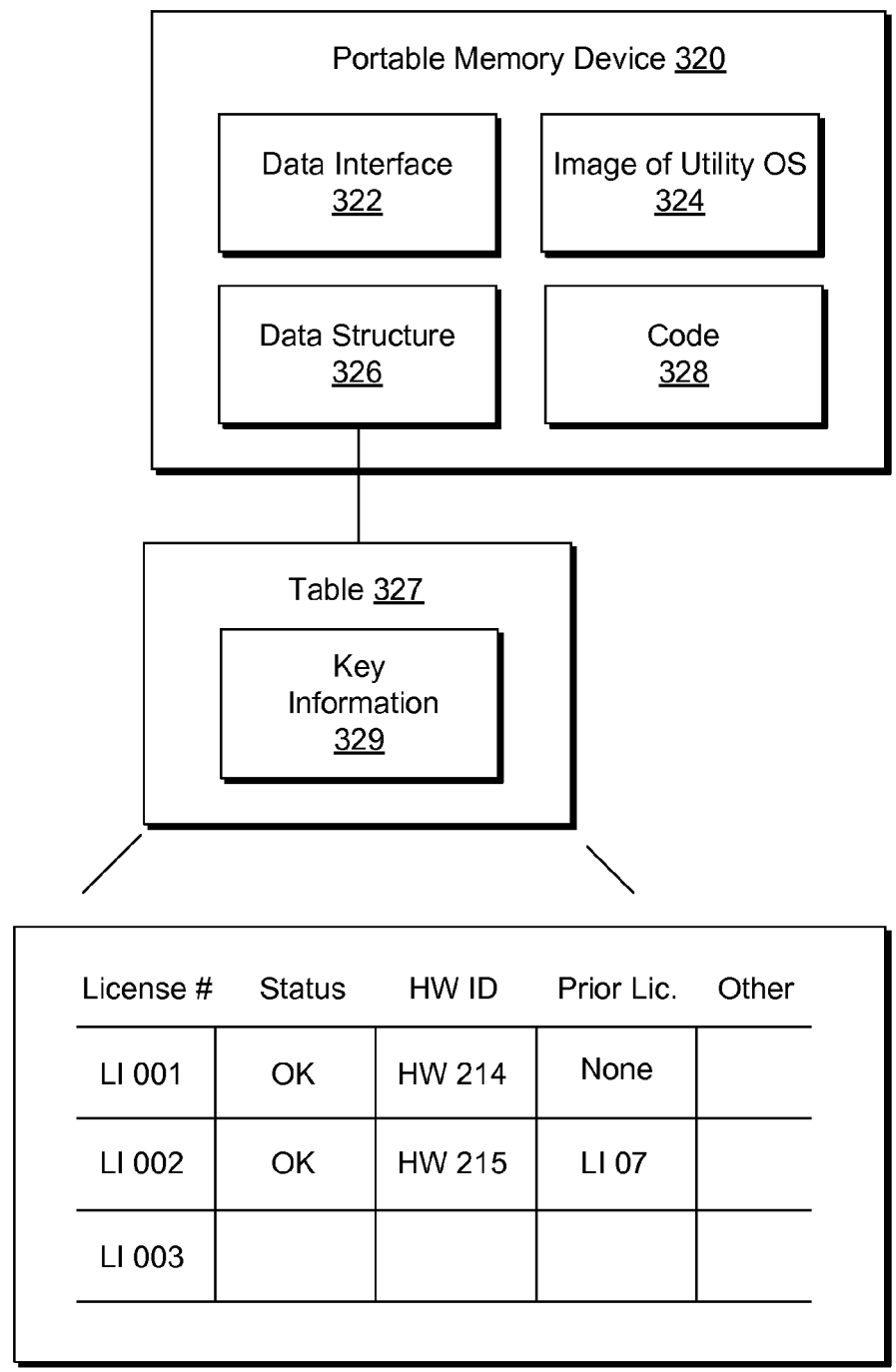
FIG. 3 is a diagram of an example of a portable memory device.

FIG. 3 shows an example of a portable memory device 320 that includes a data interface 322, an image of a utility OS 324, a data structure 326 and code 328. In such an example, the data structure 326 may include information organized as a table 327 (e.g., a database, etc.), which may include key information 329. As an example, the key information 329 may be license information. FIG. 3 also shows an example of a data structure, which may include fields for license identification information (e.g., LI 001, LI 002, etc.), status of a license, hardware identification information (e.g., HW 214, HW 215, etc.), prior license information (e.g., none, LI 07, etc.) and optionally other information. As an example, the method 210 of FIG. 2 may include injecting key from memory of a portable memory device such as the portable memory device 320 of FIG. 3.

As an example, a portable memory device can include a data interface; an image of an utility operating system; memory that includes a data structure that includes a licensing structure field for license information and an equipment manufacturer field for equipment manufacturer identification information; and code executable in an utility operating system environment established in part via the image for transmitting the data structure via the data interface. In such an example, the memory may include a plurality of the data structures where each of the data structures includes different license information (e.g., each associated with a different key, etc.). As an example, a portable memory device may include a USB interface as a data interface.

As an example, a portable memory device may include code that can be executed to select one of a plurality of data structures (e.g., particular license information, key information, etc.). As an example, license information may be for activation of an operating system. As an example, a data structure may be encrypted. For example, in a portable memory device, a table may be encrypted, a database may be encrypted, etc. Referring to the example of FIG. 3, the table 327 may be encrypted, the key information 329 may be encrypted, etc. As an example, an injection process, validation process, activation process, etc. may provide for de-encryption of encrypted information.

Figure 4:
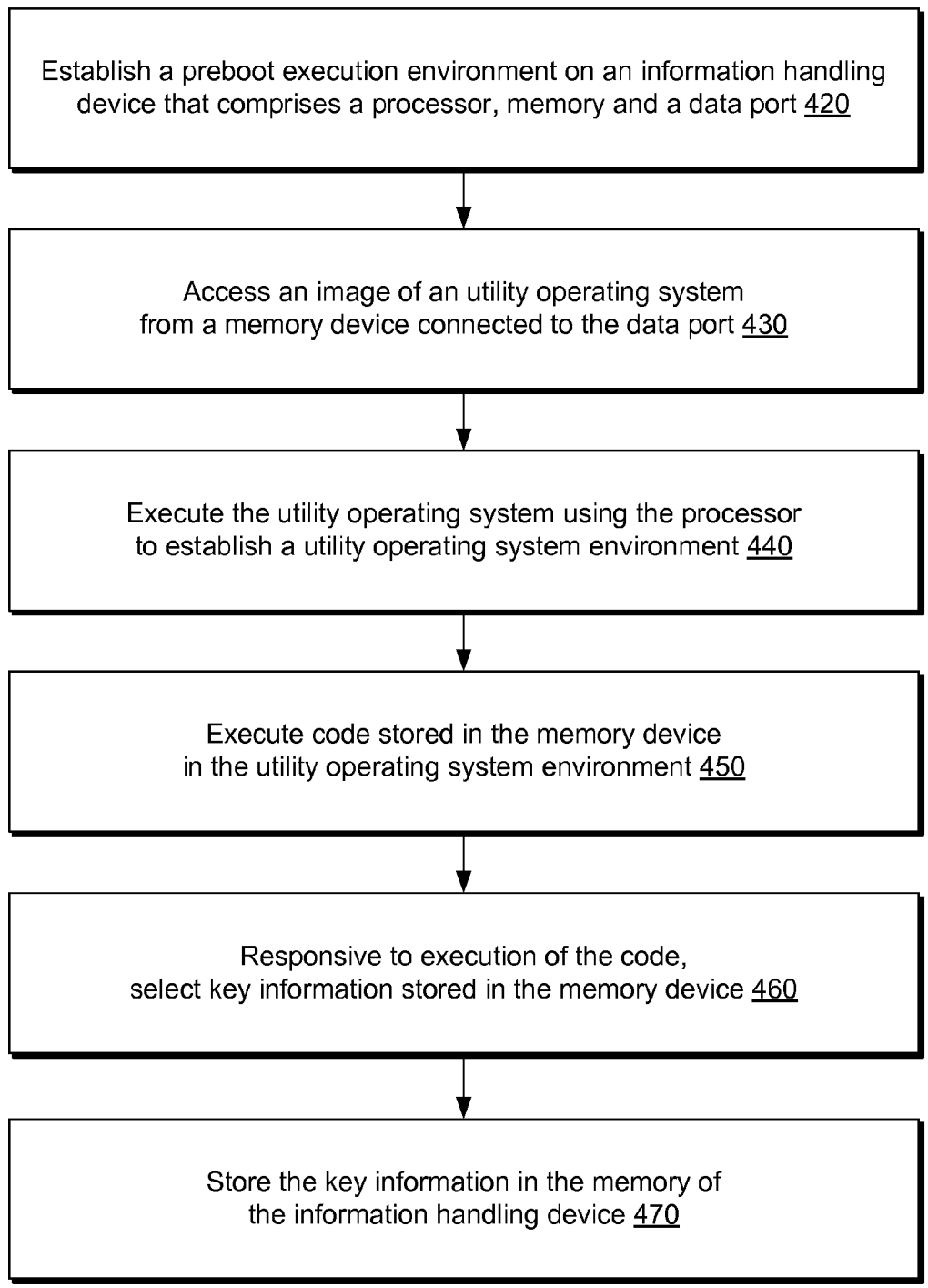
FIG. 4 is a diagram of an example of a method.

FIG. 4 shows an example of a method 410 that includes an establishment block 420 for establishing a preboot execution environment (e.g., a "PXE" or "pixie") on an information handling device that includes a processor, memory and a data port; an access block 430 for accessing an image of an utility operating system (e.g., a WINDOWS® PE OS or other utility OS) from a memory device connected to the data port; an execution block 440 for executing the utility operating system using the processor to establish a utility operating system environment; executing code stored on the memory device in the utility operating system environment 450; responsive to execution of the code, selecting key information stored in the memory device 460; and storing the key information in the memory of the information handling device 470. In such an example, the key information may be or include license information, for example, for activation of an operating system stored in the memory of the information handling system (e.g., or to be stored in the memory of the information handling system). As an example, a memory device may be a portable memory device such as the portable memory device 320 of FIG. 3.

As an example, memory of an information handling device may be accessible via a boot interface. As an example, memory of a hardware device may be accessible via a boot interface. In such examples, the memory may be non-volatile memory. In such examples, the boot interface may be, for example, a BIOS interface, an EFI interface, a UEFI interface, etc.

As an example, a method can include reading information from memory of an information handling device and storing the information to a memory device. In such an example, the memory device may include memory that stores key information where such key information may be injected into memory of the information handling device. As an example, where a method includes reading information from memory of an information handling device, such information may be current (e.g., existing) key information, which, in turn, may be stored to memory of the memory device (e.g., optionally in a database).

Figure 5:
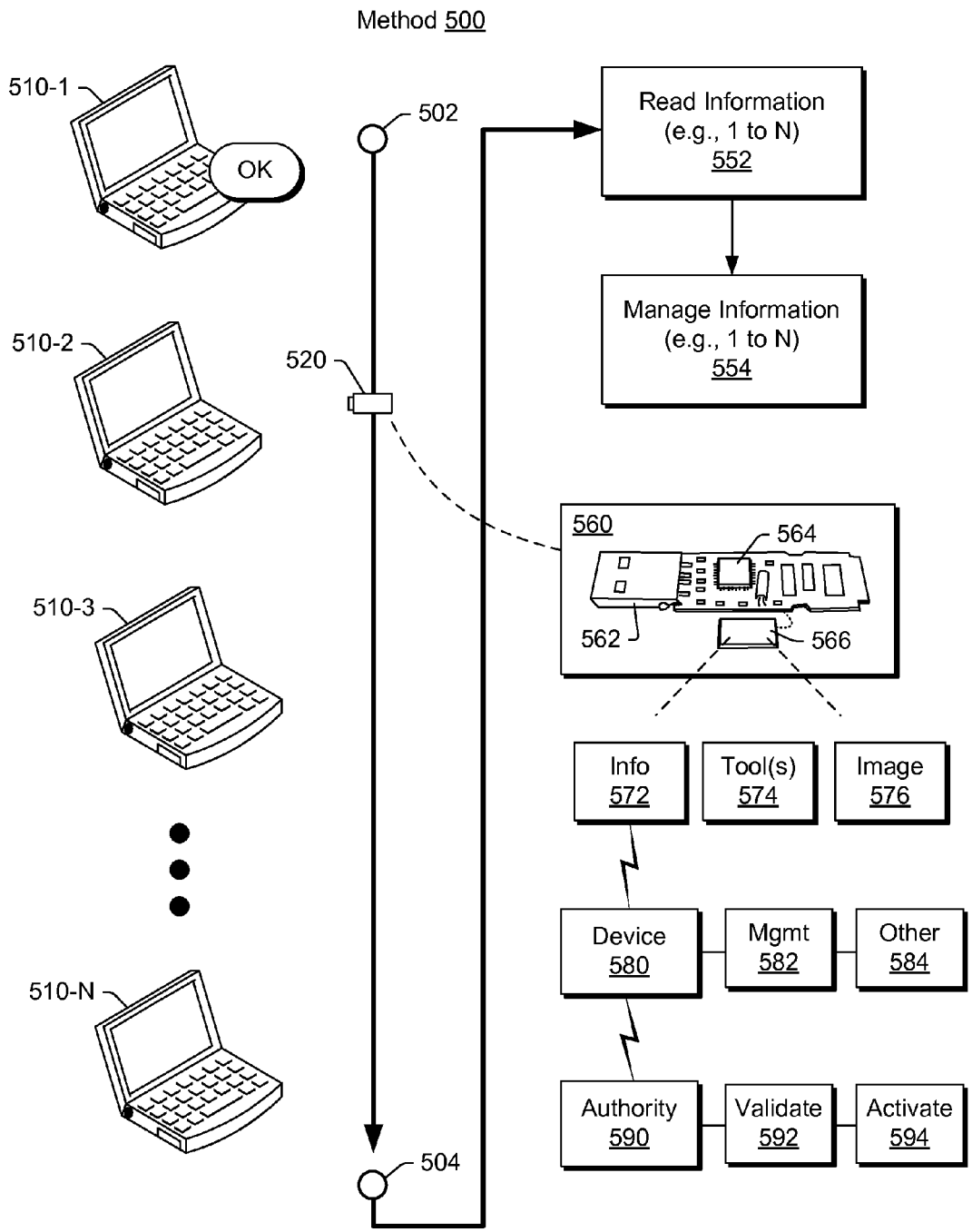
FIG. 5 is a diagram of an example of a method and examples of components, devices, etc.

FIG. 5 shows an example of a method 500 that includes a process 502 and a process 504. As to the process 502, a plurality of hardware devices 510-1 to 510-N may be provided, for example, as in a workplace of an original equipment manufacturer (OEM), along with a portable memory device 520 that includes memory storing key informations (e.g., first key information for injection into a first hardware device, second key information for injection into a second hardware device, etc.). In such an example, a worker may proceed from the hardware device 510-1 to the hardware device 510-N to inject key information into each of the hardware devices 510-1 to 510-N from memory of the portable memory device 520 and to write information germane to each of the hardware devices 510-1 to 510-N to memory of the portable memory device 520 (e.g., prior key information, status, identification information, etc.).

As an example, the portable memory device 520 may include features of the portable memory device 320 of FIG. 3. As an example, the portable memory device 520 may include one or more features of a portable memory device 560, which is configured as a USB device (e.g., shown in an approximate perspective view without an outer casing). For example, the device 560 includes a data port interface 562, a control circuitry 564 and memory 566 (e.g., one or more memory chips). In such an example, the control circuitry 564 may control reading and writing of information via the data port interface 562 to and from the memory 566.

As to the process 504, it includes a read block 552 for reading information stored in memory of the portable memory device 520 (e.g., information germane to one or more of the hardware devices 510-1 to 510-N) and a management block 554 for managing at least a portion of the read information (e.g., from the process 502).

Referring again to the portable memory device 560, it may include information 572, one or more tools 574 and an image 576 (e.g., of a pre-OS operating system such as a utility OS). In the example of FIG. 5, the information 572 may include information read, generated, etc., during a process such as the process 502. As an example, the process 504 may include at least a portion of the information 572 by a device 580 where the device includes a management module 582 and optionally one or more other modules 584. In such an example, the management module 582 may include instructions stored in memory of the device 580 and executable by a processor of the device 580 to perform one or more management tasks. For example, the management module 582 may provide for reporting information to an authority 590. In turn, the authority 590 may implement a validation module 592, an activation module 594, or both that acts upon the reported information.

As an example, consider the hardware device 510-1 as including non-volatile memory where key information has been successfully injected into the non-volatile memory from the portable memory device 520 (see, e.g., status "OK"). In such an example, the status of that key information may be stored in the portable memory device 520 and read by another device such as the device 580. In turn, the other device may report the status of the key information for the hardware device 510-1 to an authority such as the authority 590.

As an example, where the hardware device 510-1 is sold to an end user, upon accessing the Internet (e.g., via a network interface of the hardware device 510-1), communication may occur with the authority 590 (e.g., or a proxy thereof) that activates software installed on the hardware device 510-1, which may be, for example, an operating system (e.g., a WINDOW® family OS, etc.). In such an example, the key information may have been validated by the authority upon reporting and thereby ready for activation upon a user using the hardware device 510-1 to establish a communication link between the hardware device 510-1 and the authority (e.g., or a proxy thereof). For example, the link may communicate key information, identification information, etc. from non-volatile memory of the hardware device 510-1 to the authority (e.g., a server or other device) whereby the authority checks to see whether, for example, a software license associated with the communicated information is valid. In turn, the authority may communicate information to the hardware device 510-1 that allows for activation of software subject to the license.

Figure 6:
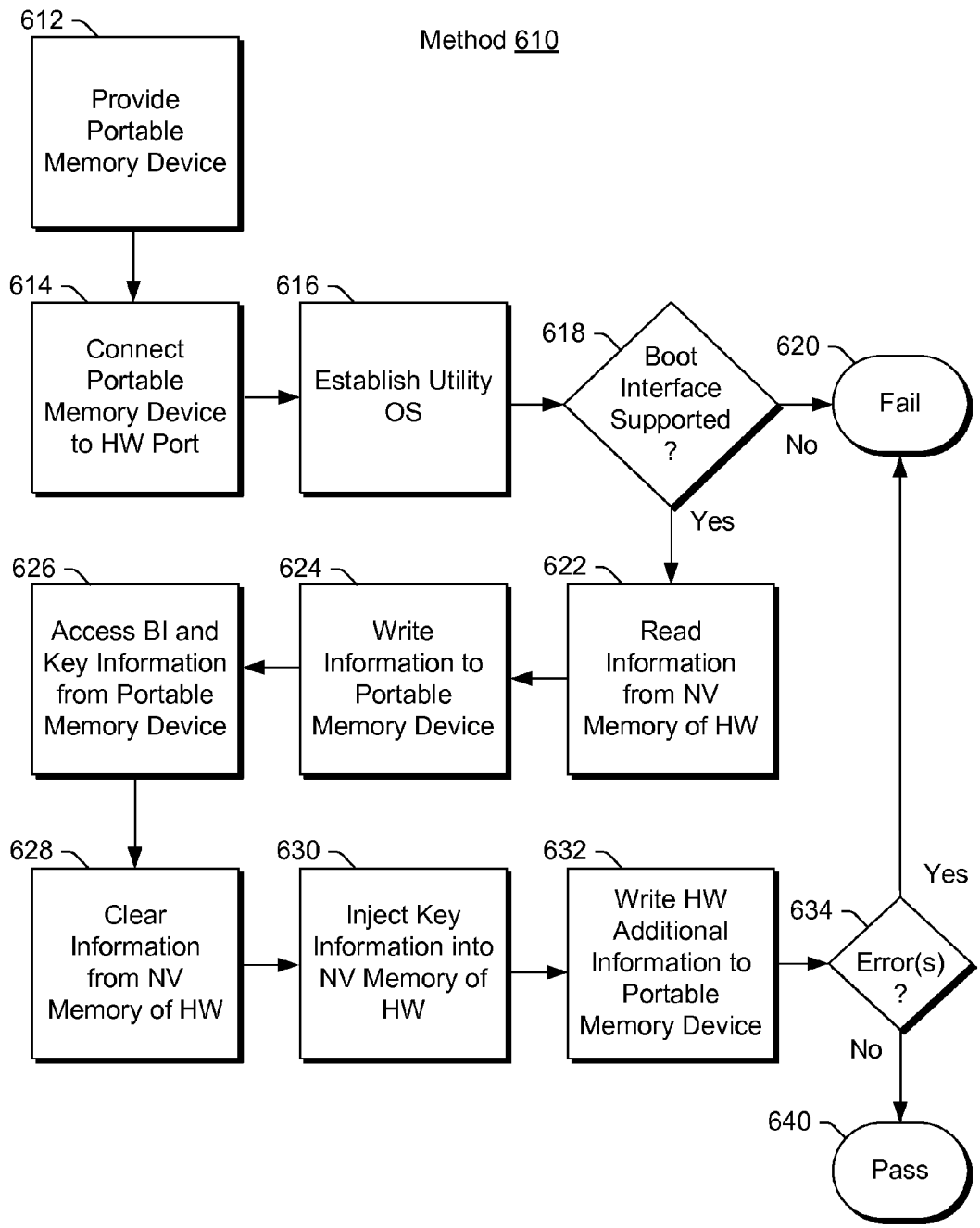
FIG. 6 is a diagram of an example of a method.

FIG. 6 shows an example of a method 610 that may include deciding whether injection of key information into hardware passes or fails. As shown in the example of FIG. 6, the method 610 includes a provision block 612 for providing a portable memory device, a connection block 614 for connecting the portable memory device to a hardware port, an establishment block 616 for establishing a utility OS and a decision block 618 to decide whether a hardware boot interface is supported. As indicated, if the hardware boot interface is not supported, the method continues to the fail block 620. In such an example, information may be written to the portable memory device to indicate that an injection process failed for that hardware.

Where the decision block 618 decides that the hardware boot interface is supported, the method 610 can continue with a read block 622 for reading information from non-volatile memory of the hardware, a write block 624 for writing information to the portable memory device (e.g., the read information, information derived in part from the read information, etc.), an access block 626 for accessing boot interface and key information from the portable memory device, a clear block 628 for clearing information from non-volatile memory of the hardware, an injection block 630 for injecting the accessed key information into the non-volatile memory of the hardware, a write block 632 for writing additional information to the portable memory device (e.g., information based at least in part on one or more prior blocks, etc.) and a decision block 634 for error reporting. In the example of FIG. 6, if the decision block 634 decides that one or more errors were not raised, then the method 610 may continue to a pass block 640, alternatively, if one or more errors were raised, the decision block 634 may direct the method 610 to the fail block 620. In such an example, a fail may occur at an early stage or at a later stage, for example, depending on a type of condition that may have given rise to an error, an incompatibility, etc. As an example, a pass indicator, a fail indicate, an error indicator, etc. may be written to the portable memory device (e.g., stored in memory, where information is optionally organized as a database, a table, etc.).

In the example of FIG. 6, the portable memory device may be a USB device (e.g., a USB drive, etc.), the utility OS may be a WINDOWS® PE OS, the boot interface may be BIOS (e.g., optionally emulated), the key information may be in the form of a bin file (e.g., an OAX bin file such as an OA3 bin file, etc.), and the information written in the write block 632 may include hash information (e.g., information hashed using a hash algorithm).

As an example, a portable memory device may store an image of a WINDOW® PE OS for establishing a utility OS environment suitable for executing tool code stored in the portable memory device. For example, once the utility OS environment is established tool code may execute to perform one or more actions such as one or more of the actions of the method 610 of FIG. 6.

As an example a tool may be an OA X.0 tool (e.g., an OA 3.0 tool, etc.) that can access key information (e.g., a digital product key, etc.). As an example, such a tool may assemble key information (e.g., binary product key data) into a bin file (e.g., an OAX.bin file) for injection into non-volatile memory of hardware (e.g., a computer, etc.). As an example, an element identified as an <AssembledBinaryFile> element may store a location of an assembled binary file (e.g., an OAX.bin file). Such a file may include a table such as an ACPI table (see, e.g., the ACPI table 110 and the OS table 120 of FIG. 1). As an example, a tool executing in a utility OS environment may inject the table into non-volatile memory of hardware. As an example, a portable memory device may include a key or key information or, for example, a key and key information (e.g., optionally in a table). For example, key information may be generated using a key and a tool prior to storing the key information in memory of a portable memory device for later injection into non-volatile memory of hardware. As an example, a portable memory device may include tool code for generating key information as well as for injecting key information.

As an example, the method 610 may include generating a hardware hash using a hash algorithm. As an example, a hardware hash may be a non-unique, truncated, irreversible hash value that represents hardware component information for a specific piece of hardware (e.g., a computer, etc.). As an example, a portable memory device may include a tool for generating such a hardware hash, for example, where the tool executes in a utility OS environment. Once generated, the hardware hash may be stored in memory of the portable memory device (e.g., in a database, etc.).

As an example, a hardware hash may be a value (e.g., a number of bytes) created by running one or more pieces of information from a hardware unit's one or more components through an algorithm, for example, such that the resultant hash value may not be readily backwards calculated to determine the one or more original values. As an example, a portion of a resulting hardware hash value may be used (e.g., to add a further measure of security). As an example, consider a processor serial number that may be approximately 96 bits in length where, when hashed, the resultant hash is about 128 bits in length. In such an example, a portion of those bits (e.g., about six bits, etc.) from resultant hash may be stored, used for activation, etc. As mentioned, such a truncation technique may further confound backwards discovery (e.g., in an effort to determine the processor serial number).

As an example, a method may include reporting information stored in a portable memory device, after performing key injection for one or more hardware devices, to Windows Activation and Validation Services (Windows AVS), which is a web service that can validate a WINDOWS® operating system and complete an activation process after an end user completes an out-of-box experience (OOBE) process. In such an example, a Windows AVS system may determine whether a product key (e.g., a digital product key for a WINDOWS® operating system) and a hardware association combination match, and then activate the WINDOWS® OS on the end user's hardware device.

As an example, an OEM of hardware devices may order keys, store at least some of the keys to a portable memory device and inject at least one of the keys (e.g., as key information) to at least a respective one of the hardware devices. In turn, the OEM may report information generated during an injection process to the provider of the keys (e.g., or appropriate authority).

As an example, an OEM may implement a so-called BIOS injection tool to inject an assembled hardware association into an ACPI MSDM table (see, e.g., the OS data table 120 of FIG. 1) to be stored in non-volatile memory of system BIOS or a system Unified Extensible Firmware Interface (UEFI).

As an example, an end user of a hardware device may complete a so-called <the next version of Windows> activation and validation process (e.g., or other activation process) where, for example, during that process the Windows AVS matches at least the product key stored on the computer to the expected value stored in its database.

As an example, a portable memory device (e.g., a USB drive or other removable media with read/write attributes) may include a WINDOWS® PE X.0 image (e.g., a utility OS), a RKIT application (e.g., one or more tools executable in a utility OS environment), and, for example, a SQLite encrypted database. In such an example, the encrypted database can include key information (e.g., optionally as pointers to bin files, bin files, etc.).

As an example, to help prevent unauthorized access to information, injection tools, etc., a database may be encrypted with its own unique double encryption key. In such an example, the actual encryption key may be dynamically generated via a decryption algorithm provided by a tool, for example, executable in a utility OS environment.

As an example, an injection process may be implemented without access to a network, a server, etc. In such an example, the process may include reading current key information, updating key information with a new key, collecting a hardware hash, for example, which may be later sent to an authority to provide for activation of software, etc.

As an example, a portable memory device may be loaded with various tools, which may be selected and used based on information read from a hardware device (e.g., to increase versatility by supporting various types of products, hardware, etc.). For example, a discovery tool may query BIOS or other information of a hardware device and then select an appropriate tool based on a result of the query. After an appropriate tool (or tools) has been selected, one or more files may be loaded into memory of the hardware device (e.g., for enabling the tool or tools in a utility OS environment). As an example, after the one or more files have been used, they may be erased from memory of the hardware device, for example, in an effort to avoid unauthorized access to the files themselves. During an injection process, an inappropriate attempt to close an executing tool may cause the hardware device to be shut down and loss of executable code (e.g., tool code).

As an example, a tool or tools may verify that a hardware device is associated with a particular manufacturer (e.g., OEM) and, for example, that a BIOS version matches a supported hardware device. As an example, a tool or tools may retrieve a hardware device's product specific information (e.g., part number, serial number, motherboard serial number, etc.) and logs such information into a database of a portable memory device.

As explained with respect to the method 610 of FIG. 6, preliminary checks may be made for a hardware device and, where support is indicated (e.g., not failed), a tool may be implemented to retrieve existing key information from non-volatile memory of the hardware device (see, e.g., the read block 622), write the existing key information, if any, to a portable memory device (see, e.g., the write block 624). As an example, existing key information may be cleared (e.g., erased) from the non-volatile memory of the hardware device (see, e.g., the clear block 628). As explained, a tool may access key information from a portable memory device and then inject that key information into non-volatile memory of a hardware device (see, e.g., the injection block 630). As an example, upon a successful injection of key information, a tool may generate a hardware hash (e.g., a hash value, code, etc.).

At the end of an injection process, a tool may render a status message to a display of a hardware device (e.g., "PASS" or "FAIL"), which may inform a worker. As an example, if a process status is "FAIL", the tool may render the reason for the failure to the display (e.g., so that the issue may be corrected and the injection process repeated for that hardware device). In such an example, the tool may execute in a utility OS environment that enables rendering of information generated through use of the tool to a display of the hardware device.

As an example, after completing all or part of the hardware devices to be injected with key information, a portable memory device may be reconnected to an application that may have originally built the files in memory of the portable memory device so that data collected may be uploaded to a management database, for example, where it may be processed and sent to an authority so that the injected hardware devices may be activate properly.

Figure 7:
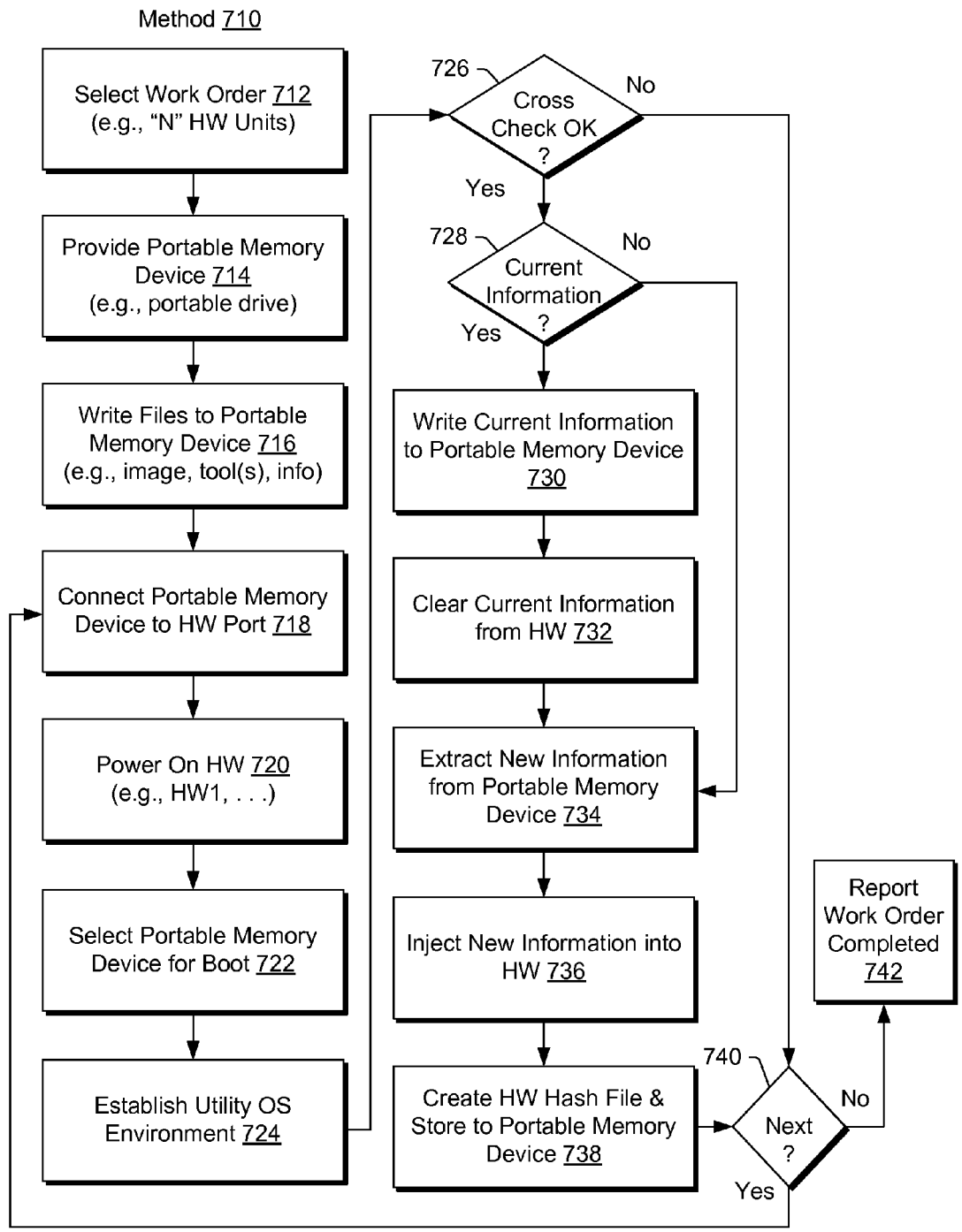
FIG. 7 is a diagram of an example of a method.

FIG. 7 shows an example of a method 710 that may be associated with one or more work orders, for example, where each work order calls for injecting information into one or more hardware units.

As shown in the example of FIG. 7, the method 710 includes a selection block 712 for selecting a work order (e.g., for "N" hardware units, where N is an integer), a provision block 714 for providing a portable memory device (e.g., a portable drive), a write block 716 for writing files to the provided portable memory device (e.g., an image, tool code and information), a connection block 718 for connecting the portable memory device to a port of a hardware unit, a power block 720 for powering on the hardware unit, a selection block 722 for selecting the connected portable memory device for booting the hardware unit, an establishment block 724 for establishing a utility OS environment on the hardware unit (e.g., using an image file as stored on the portable memory device), and a decision block 726 for deciding whether compatibility exists (e.g., between stored files, etc. on the portable memory device and the hardware unit). Such a block may also include writing information to the portable memory device (e.g., as to compatibility status, information germane to compatibility, etc.)

As indicated, if the decision block 726 decides that compatibility does not exist (e.g., a cross check fails), the method 710 may continue to a decision block 740 that decides whether another hardware unit is specified in the work order, which, if so, the method 710 may continue at the connection block 718 to connect the portable memory device to that other hardware unit (e.g., after disconnection of the portable memory device from the current hardware unit). As an example, if no further hardware units are specified by the work order, the method 710 may continue to a report block 742 for reporting information written to the portable memory device as well as, for example, other information that may have been written to the portable memory device as in the write block 716.

Referring again to the decision block 726, where a cross check is "OK", the method 710 may continue to another decision block 728 for deciding whether current information exists in the hardware unit where, if current information does exist, the method 710 continues at a write block 730 for writing the current information to the portable memory device followed by a clear block 732 for clearing the current information from the hardware unit (e.g., erasing the current information from the hardware unit). The method 710 may then continue at an extraction block 734 for extracting new information from the portable memory device. As indicated the extraction block 734 may be a point of entry for the method 710 where the decision block 728 decides that current information does not exist in the hardware unit (e.g., optionally foregoing the write block 730 and the clear block 732).

After extracting new information from the portable memory device, the method 710 may continue at an injection block 736 for injecting the new information into the hardware unit to which the portable memory device is operatively connected. Where injection is successful, the method 710 may then continue at a creation block 738 for creating a hardware hash file (e.g., a hash value, code, etc.) and storing the hardware hash file to the portable memory device (e.g., in association with the information provided in the work order for that hardware unit). After creation and storage of the hardware hash file, the method 710 may continue to the decision block 740, which, as mentioned, may decide if one or more hardware units remain in the work order for information injection by the portable memory device. Again, if the decision block 740 decides that no further hardware unit remains (e.g., per the work order), the method 710 may continue at the report block 742 for reporting at least a portion of the information written to the portable memory device.

While FIG. 7 shows an example of a method that pertains to one or more work orders, other procedures may be implemented for injection of information into a hardware unit. As an example, a scenario may exist where information (e.g., one or more keys or key informations, etc.) is sent to a repository for use on an as needed basis, for example, rather than using a work order to build a portable memory device. As an example, a key or key information may be accessed from a repository and used to build a portable memory device for injecting the key or key information into a hardware unit.

FIG. 8 shows examples of tables 810, 820 and 840. As an example, a database may include one or more of the tables 810, 820 and 840. As an example, one or more of the tables 810, 820 and 840 may be implemented in an injection process to inject key information or key informations into one or more hardware devices (e.g., hardware units, etc.).

As to the table 810, it can provide fields for tool information such as, for example, a plant code, a work order number, and a tool or tools version. As to the table 820, it can provide fields for bin data such as, for example, a bin ID, a bin file name, a drive ID, a part number, an existing bin file indicator, and an indicator that indicates whether a bin file has been consumed (e.g., injected into a hardware unit). As to the table 840, it includes BIOS data fields such as, for example, MTM (machine type/model), serial number, key ID, product key ID, BIOS information, and hardware hash. As mentioned, a hardware hash may be generated by a tool during an injection process and stored in memory of a portable memory device. For example, a portable memory device may include a field such as the hardware hash field of the table 840 for storing one or more hardware hashes (e.g., values, codes, etc.). In such an example, an entry in a table (e.g., or database) may include a product key ID field that can be associated with a hardware hash field (e.g., as shown by two columns that may be filled for each row of the table, where each row may be for a different hardware unit).

In FIG. 8, the tables 810, 820 and 840 also include additional tabs, which may be optional (e.g., BIOS tools, Log Data, Other). As an example, one or more of the tables 810, 820 and 840 may be associated with a database. As an example, such a database may be modifiable, for example, to accommodate changes in techniques, technologies, etc.

As an example, a work order (e.g., a work site) may be allowed to change an OS version (e.g., from WINDOWS® 8 OS Standard version to Professional version), for example, where a field may be provided such as "AllowOsMismatch" (e.g., to a tool information tab). As an example, the "BIOS Tools" tab may provide a table that can include fields such as one or more of "OsDescToolName", "OsDescTool", "OsDescAdditionalFile1 Name", "OsDescAdditionalFile1", "OsDescAdditionalFile2Name", "OsDescAdditionalFile2", and "OsDescCmd", which may, for example, support updating an OS description inside BIOS for work orders (e.g., work sites) that may be permitted to make such changes.

As an example, a database may be flexible (e.g., extensible), for example, to include an ability to add one or more additional temporary and/or alternate file and/or data fields.

Figure 9:
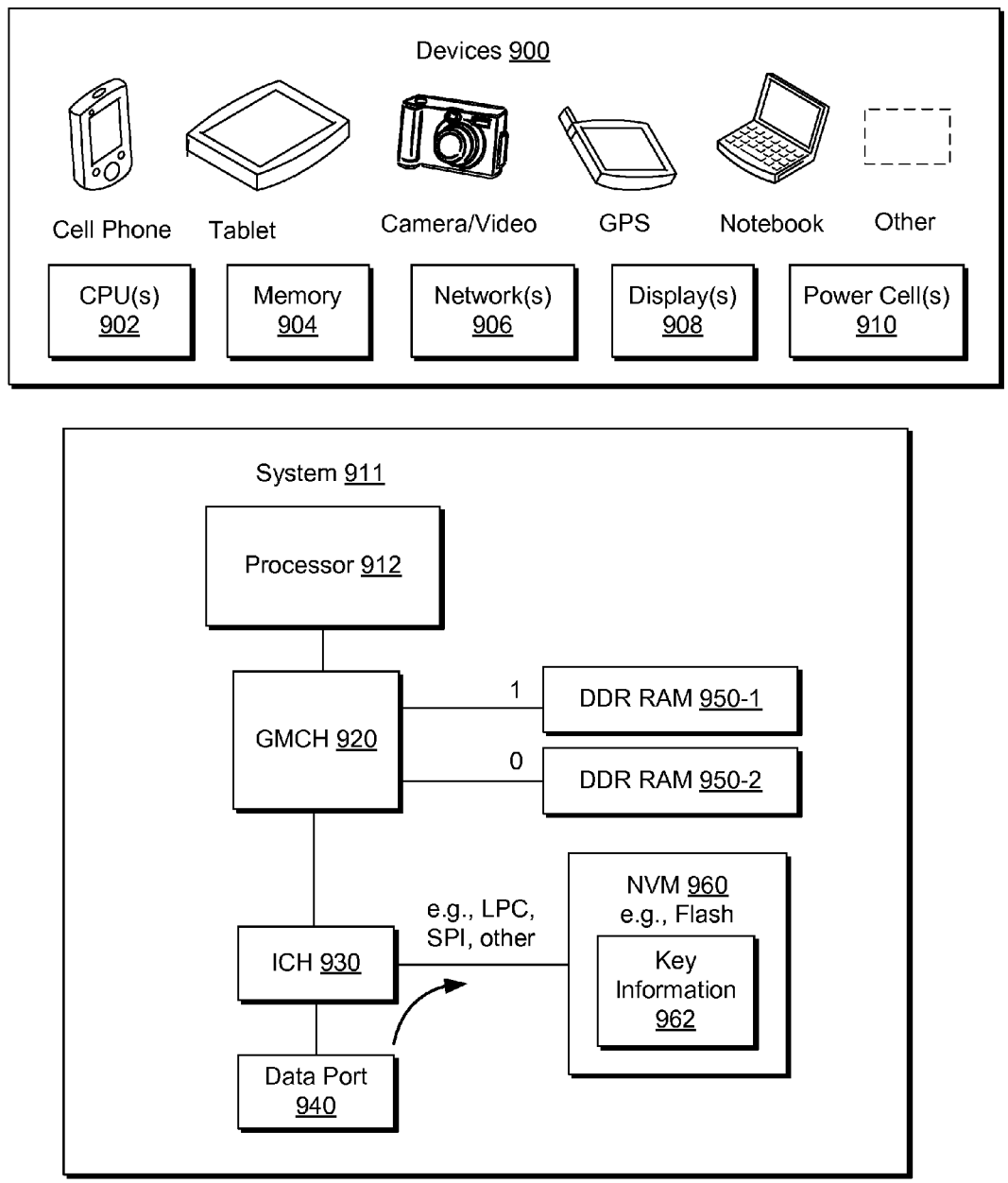
FIG. 9 is a diagram of examples of devices and an example of a system.

As an example, a flexible structure may include tabs (e.g., or tables) with fields such as, for example:
 tblToolsInfo: Temp, Flex, Alt1, Alt2, Alt3, Alt4, Alt5
 tblBinData: Temp, Flex, Alt1, Alt1File, Alt2, Alt2File, Alt3, Alt3File, Alt4, Alt4File, Alt5, Alt5File
 tblBiosTools: Temp, Flex, Alt1, Alt1File, Alt1 Cmd, Alt2, Alt2File, Alt2 Cmd, Alt3, Alt3File, Alt3 Cmd, Alt4, Alt4File, Alt4 Cmd, Alt5, Alt5File, Alt5 Cmd
 tblBiosData: Temp, Flex, Alt1, Alt1File, Alt2, Alt2File, Alt3, Alt3File, Alt4, Alt4File, Alt5, Alt5File
 tblLogData: Temp, Flex, Alt1, Alt2, Alt3, Alt4, Alt5
 tblOa3Tools: Temp, Flex, Alt1, Alt1File, Alt1 Cmd, Alt2, Alt2File, Alt2 Cmd, Alt3, Alt3File, Alt3 Cmd, Alt4, Alt4File, Alt4 Cmd, Alt5, Alt5File, Alt5 Cmd
 tblTempData: Temp, Flex, Alt1, Alt1File, Alt1 Cmd, Alt2, Alt2File, Alt2 Cmd, Alt3, Alt3File, Alt3 Cmd, Alt4, Alt4File, Alt4 Cmd, Alt5, Alt5File, Alt5 Cmd
 tblTempInfo: Temp, Flex, Alt1, Alt1File, Alt1 Cmd, Alt2, Alt2File, Alt2 Cmd, Alt3, Alt3File, Alt3 Cmd, Alt4, Alt4File, Alt4 Cmd, Alt5, Alt5File, Alt5 Cmd FIG. 9 shows some examples of devices 900 and an example of a system 911. As shown, the devices 900 may include one or more processors 902, memory 904, one or more network interfaces 906, one or more displays 908 and one or more power cells 910. As shown in FIG. 9, for example, a cell phone, a tablet, a camera, a GPS device, a notebook computer, or other device may be considered hardware, hardware devices, hardware units, etc. into which information may be injected.

As an example, a device may include a system such as the system 911, which includes a processor 912, a graphics memory controller hub (GMCH) 920 and an I/O controller hub (ICH) 930 as well as memory such as DDR2 RAM 950 and non-volatile memory 960, which may be accessible via a low pin count interface (LPC), a serial peripheral interface (SPI), etc. As an example, the system 911 may be a motherboard. In the example of FIG. 9, the ICH 930 can provide for input from and output to a data port 940. In such an example, key information 962 may be input from the data port 940 and stored in the non-volatile memory 960. As an example, the non-volatile memory 960 may be flash memory or another type of non-volatile memory.

As indicated in the example system 911 of FIG. 9, an injection process to inject key information may optionally be performed without network access, without hard drive access, etc. For example, a portable memory device such as a USB device may be operatively coupled to the data port 940 for enabling injection of the key information 962 (see, e.g., the portable memory device 320 of FIG. 3). As an example, the system 911 may be configured to execute a boot agent that provides for selection of a boot source. As an example, where a portable memory device is operatively coupled to the data port 940, it may be identified as a boot source by a boot agent and optionally selected as the boot source. In such an example, a pre-OS environment may be established, for example, via a pre-OS operating system image (e.g., a utility OS image) provided by the portable memory device. As an example, where the system 911 includes access to a hard drive, a solid state drive, etc., such a drive may include a fuller featured operating system, which may be, for example, activatable using the key information 962.

As an example, a device may include a hypervisor, for example, executable to manage one or more operating systems. With respect to a hypervisor, a hypervisor may be or include features of the XEN® hypervisor (XENSOURCE, LLC, LTD, Palo Alto, Calif.). In a XEN® system, the XEN® hypervisor is typically the lowest and most privileged layer.

Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform.

As described herein, various acts, steps, etc., can be implemented as instructions stored in one or more computer-readable storage media. For example, one or more computer-readable storage media can include computer-executable (e.g., processor-executable) instructions to instruct a device.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 10:
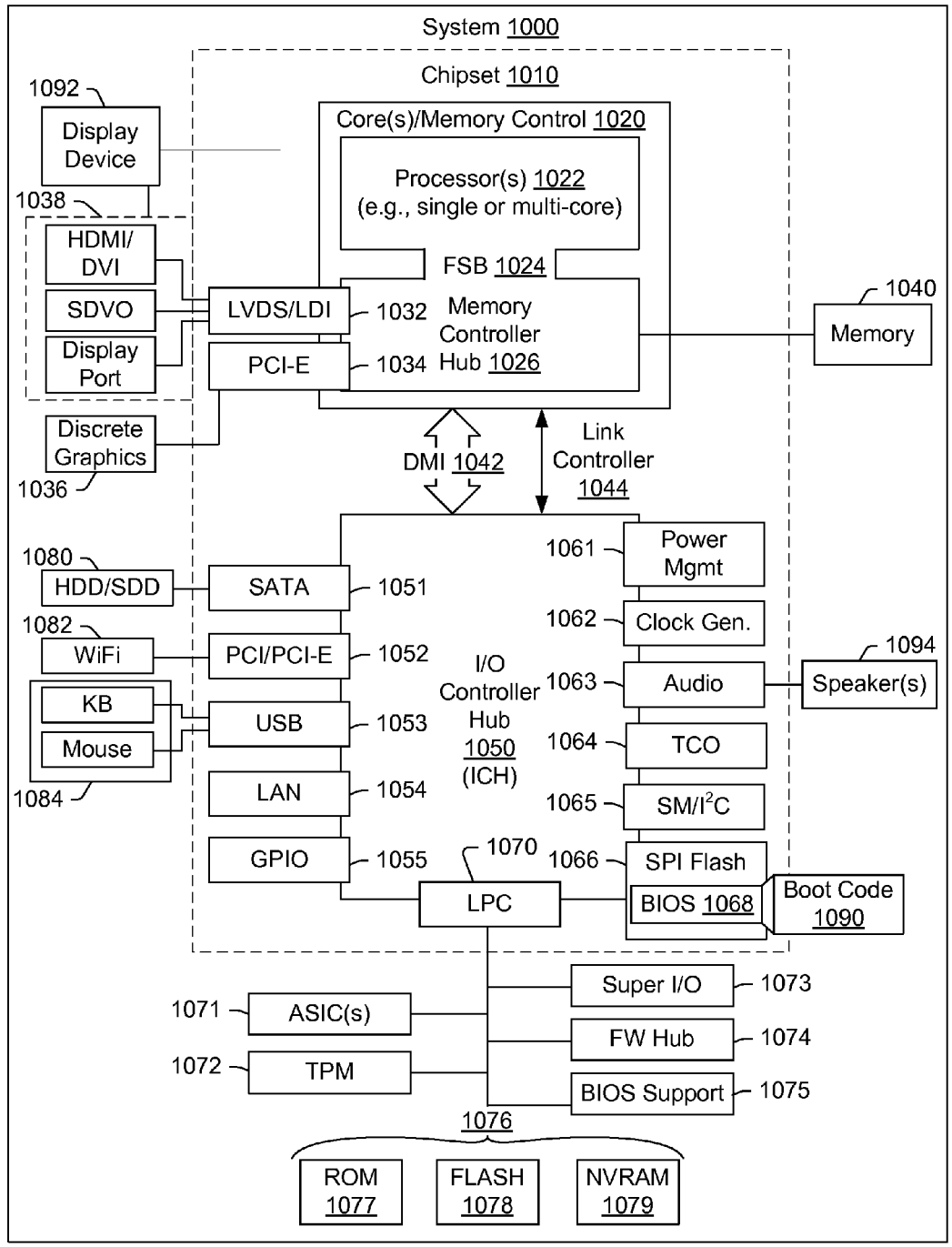
FIG. 10 is a diagram of an example of a system.

While various examples circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000.

As shown in FIG. 10, the system 1000 includes a so-called chipset 1010. A chipset refers to a group of integrated circuits, or chips, that are designed to work together. Chipsets are usually marketed as a single product (e.g., consider chipsets marketed under the brands Intel®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), mice and various other devices (e.g., cameras, phones, storage, media players, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system or component seeking access is the expected system or component.

The system 1000, upon power on, may be configured to execute boot code 1090 for the BIOS 1068, as stored within the SPI Flash 1066, and thereafter processes data under the control of one or more operating systems and application software (e.g., stored in system memory 1040).

As an example, the system 1000 may include circuitry for communication via a cellular network, a satellite network or other network. As an example, the system 1000 may include battery management circuitry, for example, smart battery circuitry suitable for managing one or more lithium-ion batteries.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
    booting a hardware device, that comprises a processor and a data port, via a removable memory device that is operatively connected to the data port wherein the booting establishes a utility operating system environment using the processor and an image of the utility operating system stored in memory of the removable memory device;
    selecting one of a plurality of different key informations in the memory of the removable memory device;
    executing code in the utility operating system environment that injects the selected key information into non-volatile memory of the hardware device;
    accessing identification information stored in the hardware device that identifies the hardware device;
    associating the selected key information and the identification information in the memory of the removable memory device; and
    after disconnection of the removable memory device from the data port of the hardware device, reading the associated key information and identification information, via the removable memory device being operatively connected to another hardware device, for reporting the associated key information and identification information to an activation service.

2. The method of claim 1 wherein the booting comprises accessing the image of the utility operating system from the memory of the removable memory device and executing the utility operating system using the processor to establish the utility operating system environment.

3. The method of claim 2 wherein the injecting comprises accessing the code from the memory of the removable memory device via the data port.

4. The method of claim 1 wherein the key information provides for activation of an operating system executable on the hardware device.

5. The method of claim 4 wherein activation of the operating system occurs after reporting of the associated key information and identification information via a network to an activation service.

6. The method of claim 1 comprising injecting another key information of the plurality of different key informations from memory of the removable memory device into non-volatile memory of another hardware device via a data port of the other hardware device;
    accessing another identification information stored in the other hardware device that identifies the other hardware device; and
    associating the other key information and the other identification information of the other hardware device in the memory of the removable memory device.

7. The method of claim 1 wherein the associating comprises storing the key information and the identification information in a database in the memory of the removable memory device.

8. The method of claim 1 wherein the removable memory device comprises a USB device and wherein the data port comprises a USB port.

9. The method of claim 1 wherein the hardware device comprises a motherboard that comprises the non-volatile memory and the processor.

10. A portable memory device comprising:
    a data port interface;
    an image of an utility operating system accessible via the data port interface;
    memory that comprises a data structure that comprises a licensing structure field for license information and an equipment manufacturer field for equipment manufacturer identification information; and
    code accessible via the data port interface for execution in a utility operating system environment established in part via an external processor and the image wherein the code comprises instructions to access at least the license information via the data port interface.

11. The portable memory device of claim 10 wherein the memory comprises a plurality of the data structures wherein each of the data structures comprises different license information.

12. The portable memory device of claim 10 wherein the data port interface comprises a USB interface.

13. The portable memory device of claim 10 wherein the code comprises instructions to select one of the plurality of data structures.

14. The portable memory device of claim 10 wherein the license information comprises license information for activation of an operating system.

15. The portable memory device of claim 10 wherein the data structure comprises an encrypted data structure.

16. A method comprising:
    establishing a preboot execution environment on an information handling device that comprises a processor, memory and a data port;
    accessing an image of an utility operating system from a removable memory device operatively connected to the data port;
    executing the utility operating system using the processor to establish a utility operating system environment;
    executing code stored on the removable memory device in the utility operating system environment;
    responsive to execution of the code, selecting license key information stored in the removable memory device;
    storing the license key information in the memory of the information handling device; and
    after disconnection of the removable memory device from the data port of the information handling device, based at least in part on the license key information, executing corresponding licensed software on the information handling device.

17. The method of claim 16 wherein the license key information comprises information for activation of an operating system stored in the memory of the information handling system.

18. The method of claim 16 wherein the memory of the information handling device comprises memory accessible via a boot interface.

19. The method of claim 16 comprising reading information from the memory of the information handling device and storing the information to the removable memory device.

* * * * *